A. H. BURNS.
PLANTER ATTACHMENT.
APPLICATION FILED AUG. 10, 1911.

1,061,596.

Patented May 13, 1913.

Inventor
Alonzo H. Burns

Witnesses

By Wm. C. W. Intire
Attorney

UNITED STATES PATENT OFFICE.

ALONZO H. BURNS, OF JEFFERSON, GEORGIA.

PLANTER ATTACHMENT.

1,061,596.  Specification of Letters Patent.  Patented May 13, 1913.

Application filed August 10, 1911. Serial No. 643,354.

*To all whom it may concern:*

Be it known that I, ALONZO H. BURNS, a citizen of the United States, residing at Jefferson, in the county of Jackson and State of Georgia, have invented certain new and useful Improvements in Planter Attachments; and I do hereby declare the following to be a full, clear, and exact description of the invention, such as will enable others skilled in the art to which it appertains to make and use the same.

This invention relates to new and useful improvements in planter attachments, and more particularly to that class adapted to be used in connection with wheat planters.

An object of this invention is the provision of a device of this character which, when applied to a wheat planter will convert the same into an open furrow planter for oats or other like grain.

Another object of this invention is the provision of an attachment for planters such as described, which consists principally in a pair of disks so arranged, one in front of the other and at angles with respect to each other, that they will dig an open furrow.

Another object of this invention is to improve and simplify devices of this character, rendering them comparatively simple and inexpensive to manufacture, reliable and efficient in use, and readily operated.

With the above and other objects in view this invention resides in the novel features of construction, formations, combinations and arrangements of parts to be hereinafter more fully described, claimed and illustrated in the accompanying drawings, in which—

Figure 1:
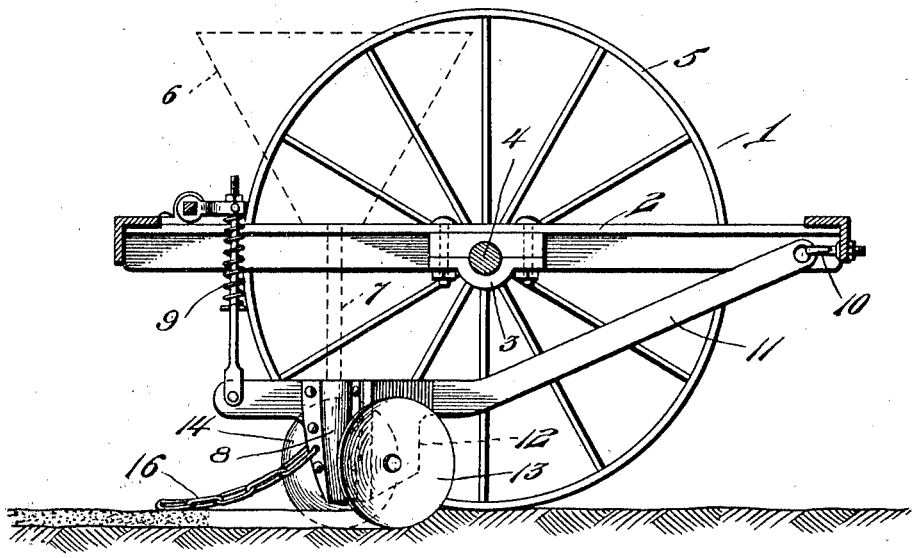
Figure 2:
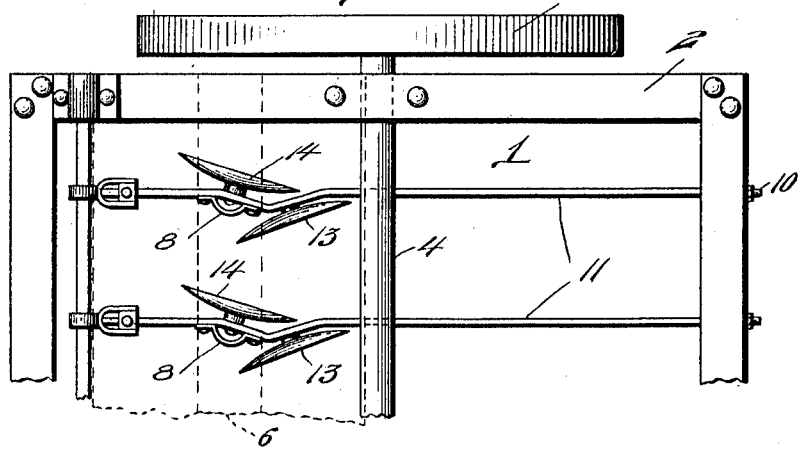
Figure 3:

Figure 1 is a side elevation of my invention; Fig. 2 is a plan view thereof, and Fig. 3 is a cross sectional view of the furrow made by the plow.

Referring to the drawings by characters of reference, the numeral 1 designates generally a wheat planter of ordinary design, which consists of a substantially U-shaped supporting frame 2, to the under side of which is journaled in suitable bearings 3 an axle 4, the opposite ends of which receive the customary supporting wheels 5.

Secured to the front cross bar of the frame 2 are hooks or other suitable fastening means 10, and mounted on said hooks are drag bars 11 having their front extremities formed as shown in the drawings, with upwardly inclined portions while their rear extremities are extended on a substantially horizontal plane and are supported by means of spring actuated rods 9 pivotally secured to their rear ends, and to a suitable support on the frame 2. The horizontal portion of the drag bars is formed with an angular offset having its lower portion extended as shown at 12 with a disk 13 secured to the forward portion of the offset 12 and disk 14 secured to the rearward portion of said offset. A suitable hopper 6 is secured in the usual manner on the frame 2 and has the feed tubes 7 connected therewith and emptying into the droppers 8 mounted on the opposite side of the rear portion of the offset 12 from the disks 14.

16 indicates drag chains secured to the rear edge of the offsets 12 that are operated to cover the seed deposited through the droppers 8.

It will be apparent that the disk 13 is arranged slightly in advance of the disk 14, which prevents all clogging of the earth between said disks in case the ground is plowed very moist, or is covered with sod.

As clearly shown in Fig. 2, the plane of the edges of the disks 14 are substantially on a line that intersects the forward edge of the disk 13, while the forward edge of the disks 14 are slightly in advance of the pivots of the disks 13. By this construction, it will be apparent that the furrow made by the two disks will have a ridge along its median line, as clearly shown in Fig. 3, on which the seed drops and is scattered to both sides of the ridge by means of the drag chain 16 and is covered by the earth removed by said drag.

It will be apparent from an inspection of Fig. 3 of the drawings that there is cut a deep, open furrow into which the seed are deposited by the droppers 8. This deep furrow serves to prevent the seed from being scattered or displaced by means of heavy rains or winds, and protects the plants when small from cold, and when the sides of the furrows freeze the earth is loosened and rolls down and produces a slight cultivation of the plant.

Having thus fully described this invention, what I claim as new and desire to protect by Letters Patent is:

1. A seed planter consisting of a frame, drag bars secured to said frame, seed droppers secured to said drag bars, and two disks carried by each of said drag bars, one of said disks being slightly in advance of the other, the plane of the edges of the rearmost disk being on a line with the forwardmost edge of the forward disk, substantially as and for the purposes set forth.

2. The combination in a seed planter, of a frame, drag bars secured to said frame, seed droppers carried by said drag bars, each of said drag bars having an angular offset portion, and forwardly converging disks carried by each of said drag bars, one of said disks being arranged slightly in advance of the other, the rearmost disk having the plane of its edge in substantial alinement with the forwardmost edge of the forward disk and the forwardmost edge of the rearmost disk being in advance of the pivot of the forward disk, substantially as and for the purposes set forth.

3. In combination with a seed planter, a frame, drag bars secured to the frame, each of said drag bars being provided with an angular offset portion, and flanges extending downwardly from said offset portions, a pair of forwardly converging disks carried by the flanges on each drag bar, the plane of the edge of the rearmost disk of each pair being substantially in alinement with the forwardmost edge of the forward disk and the forward edge of the rearmost disk being in advance of the pivot of the forwardmost disk, arms connecting said drag bars with the frame, and drags connected to said drag bars.

In testimony whereof I affix my signature in presence of two witnesses.

ALONZO H. BURNS.

Witnesses:
FRED EVANS,
W. W. DICKSON.

---

Copies of this patent may be obtained for five cents each, by addressing the "Commissioner of Patents, Washington, D. C."